United States Patent [19]

Quarendon et al.

[11] Patent Number: 5,283,859

[45] Date of Patent: * Feb. 1, 1994

[54] METHOD OF AND SYSTEM FOR GENERATING IMAGES OF OBJECT TRANSFORMS

[75] Inventors: Peter Quarendon, Romsey; Stephen J. P. Todd, Winchester, both of United Kingdom

[73] Assignee: International Business Machines Corporation, Armonk, N.Y.

[*] Notice: The portion of the term of this patent subsequent to Aug. 15, 2006 has been disclaimed.

[21] Appl. No.: 403,848

[22] Filed: Aug. 31, 1989

Related U.S. Application Data

[63] Continuation of Ser. No. 86,764, Aug. 18, 1987, abandoned.

[30] Foreign Application Priority Data

Sep. 3, 1986 [GB] United Kingdom ............... 8621256

[51] Int. Cl.$^5$ ............................................ G06F 15/72
[52] U.S. Cl. ............................... 395/127; 395/123; 395/121; 395/120
[58] Field of Search ............... 340/729, 747, 723; 364/522, 521; 395/127, 120, 123, 124, 128, 121

[56] References Cited

U.S. PATENT DOCUMENTS

| | | | |
|---|---|---|---|
| 3,602,702 | 8/1971 | Warnock | 364/521 |
| 3,816,726 | 6/1974 | Sutherland et al. | 364/518 |
| 3,889,107 | 6/1975 | Sutherland | 382/41 |
| 4,586,038 | 4/1986 | Sims et al. | 340/729 |
| 4,586,145 | 4/1986 | Bracewell et al. | 364/518 |
| 4,649,498 | 3/1987 | Kedem et al. | 364/518 |
| 4,694,404 | 9/1987 | Meagher | 364/518 |
| 4,858,149 | 8/1989 | Quarendon | 364/522 |

OTHER PUBLICATIONS

J. R. Woodwark et al.: "The Derivation of Graphics From Volume Models by Recursive Subdivision of the Object Space" Computer Graphics, 80, Aug. 1980, pp. 335–343.
A. H. Barr: "Global and Local Deformations of Solid Pramitives" Computer Graphics, vol. 18, No. 3, Jul. 1984, pp. 21–30.

*Primary Examiner*—Gary V. Harkcom
*Assistant Examiner*—Raymond J. Bayerl
*Attorney, Agent, or Firm*—Mark S. Walker

[57] ABSTRACT

A method of generating a two-dimensional (2-D) image of a transform of a three-dimensional (3-D) solid object involves sub-dividing a 3-D box defining viewing space into sub-boxes, generating test-cells in object space by performing an inverse transform on the sub-boxes and determining which of the test-cells intersect the object. Thus, the need to transform the object itself is avoided. A particular application of the method is the generation of 2-D perspective images of a 3-D solid object. A graphics processing system including means for performing the method is defined.

10 Claims, 3 Drawing Sheets

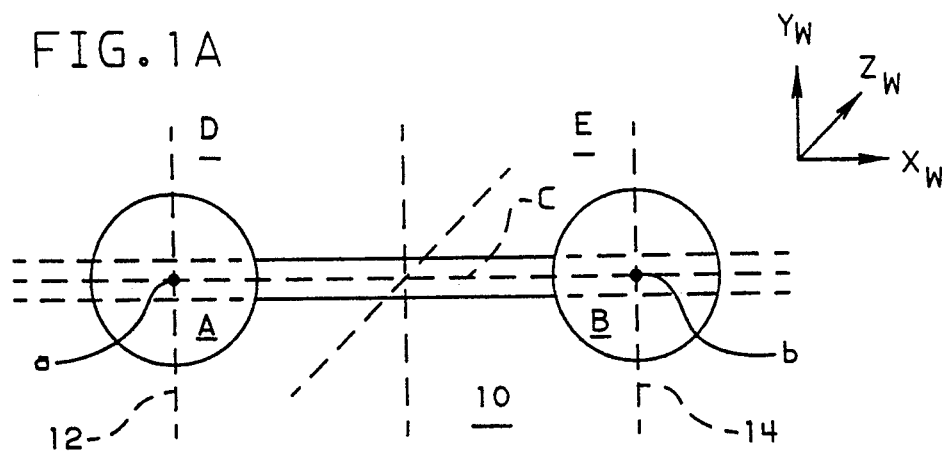
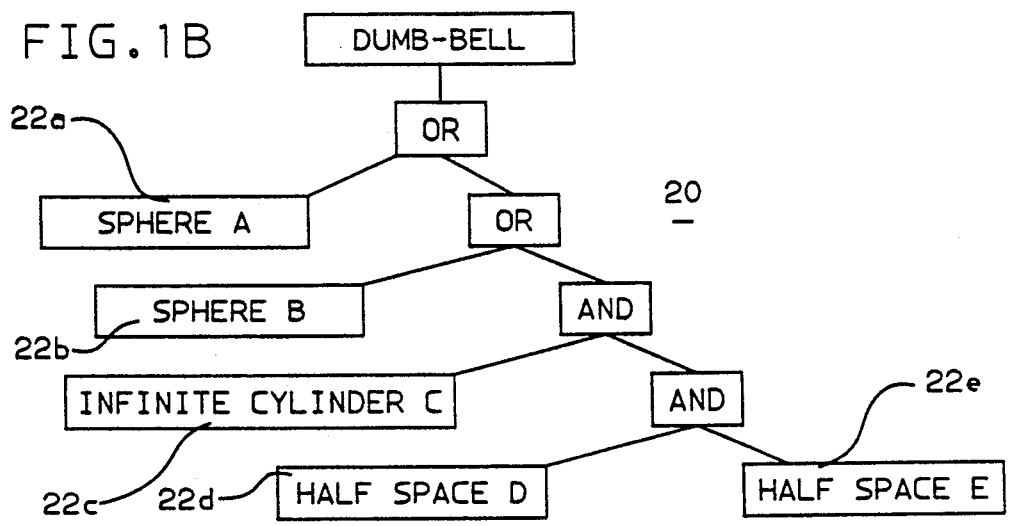
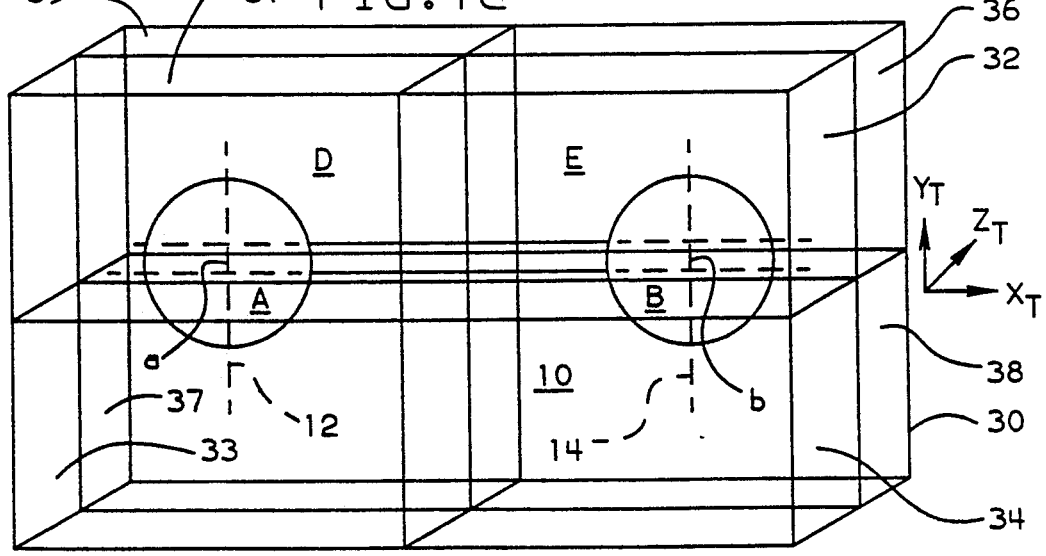

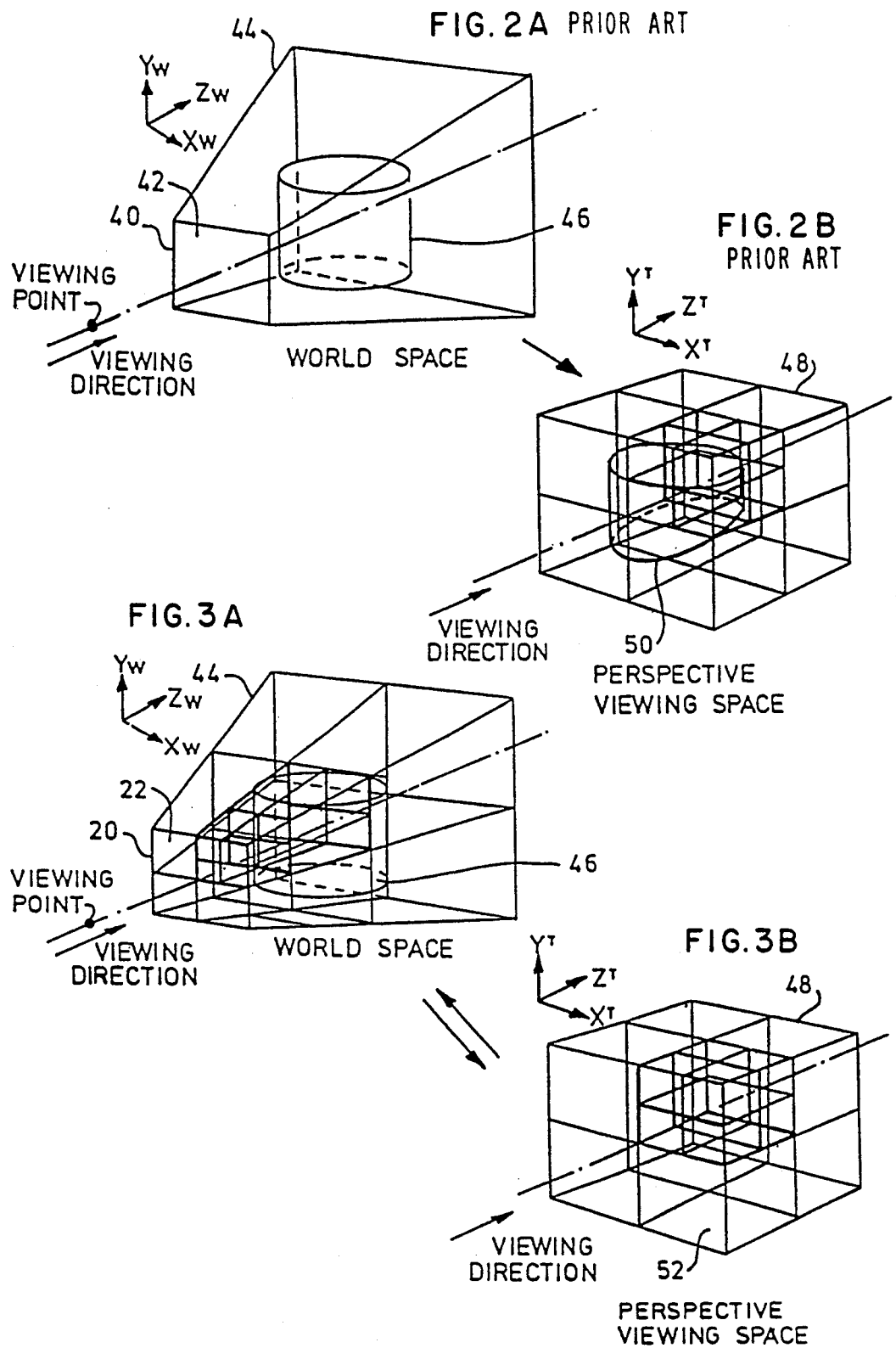

METHOD OF AND SYSTEM FOR GENERATING IMAGES OF OBJECT TRANSFORMS

This is a continuation of application Ser. No. 07/086,764, filed Aug. 18, 1987, now abandoned.

BACKGROUND OF THE INVENTION

1. Field of the Invention

The present invention relates to a method of generating two-dimensional images of three-dimensional solid objects in a graphics processing system and to a graphics processing system for performing such a method.

Objects may be represented in a graphics processing system using various techniques. One which is particularly suitable for representing solid objects is "Constructive Solid Geometry" (CSG). In accordance with this technique a three-dimensional (3-D) solid object is represented by a functional definition identifying the set of points which lie within the object. Typically, the object is defined by a Boolean function which returns a "true" if applied to a point within the object and returns a "false" otherwise. This technique contrasts with, for example, line drawing techniques where the edges and surfaces of an object are defined rather than its volume.

The functional definition or representation of an object effectively defines the set of points which make up the object. The functional definition of a sphere, for example, defines the set of points lying within a given radius of a center point. Composite objects are defined by combining the functional definitions of constituent basic objects, or "primitives", e.g. spheres, infinite planes, infinite cylinders. The functional definition of a dumb-bell, for example, comprises the functional definition of each of two spheres at different positions, the functional definition of an infinite cylinder whose axis passes through the centers of the spheres, and the functional definition of two planar half-spaces which truncate the cylinder at the spheres. The functional definitions of the spheres, the cylinder and the half-spaces are combined using combinational operators such as the set union and intersection operators (i.e. using set theory principles). Primitives can also be combined using set subtracting operators to define, for example, a composite object with a cut-out or hole. In this way hollow composite objects can be defined by subtracting a smaller object from a larger one. Such composite objects are still "solid" within the meaning of this document because the individual object definitions which make up the composite object are solid.

A composite object formed from primitives can be structured in a number of ways. However it is usual to use a tree structure with the composite object defined at the root of the tree, the primitives defined at the leaves and operators defining the combinational operations to be performed to construct the object from the primitives stored at nodes in the tree.

The range of shapes which can be defined in this way is, in practice, dependent on the set of primitives chosen. In many prior systems, objects are constructed only from planar half-spaces. A planar half-space is a functional definition of an infinite object which exists on one side of a plane. The functional definition of a cube is, for example, defined by combining the functional definitions of six half-spaces using the set intersection operator. Other systems have also been implemented using cylinders, spheres, tori, ellipsoids and even helices.

2. Description of the Prior Art

The standard technique for generating a two-dimensional (2-D) image of a transform of a three-dimensional (3-D) solid object (e.g. a 2-D perspective image of the object) is to transform the object so as to correspond with the perspective i.e., the objects are made relatively larger at the front and smaller at the back. In other words, the object is transformed from the space in which it exists (world-space) into perspective viewing space by subjecting it to a perspective transform algorithm. Then, in perspective viewing space, tests are performed to see which surfaces are at the front of the object and these are represented on the 2-D perspective image. It is usual to use a technique called spatial sub-division.

This approach was adopted by Woodwark and Quinlan in their paper entitled "Reducing the effect of complexity on volume model evaluation" published in March 1982 in Computer Design, Vol 14, No. 2.

Their method of producing a 2-D perspective view of a 3-D solid object, which employs spatial sub-division, can be summarised as follows:

The object in question is transformed into perspective space. This perspective representation of the object is then enclosed in a three-dimensional rectangular box. A test is made to find whether the box intersects this object. If it does the box is subdivided into eight equal sub-boxes, dividing each square face into four smaller rectangles. These smaller rectangular boxes are then tested in turn and any of which are empty are discarded. Those which contain part of the object are kept and subdivided again and the process is repeated until the rectangular boxes are sufficiently small to correspond with single screen pixels. These pixels are then coloured appropriately on the screen.

This prior method works well in principle, as long as the object can be easily transformed into perspective space—if the object has, for example, flat surfaces. In the case of objects such as conical, spherical or cylindrical surfaces, the functional definitions of the object in perspective space rapidly become so complex as to be impractical to manage using the prior approach, especially in the case of composite objects (e.g. complex molecules) which are made up of many such shapes.

SUMMARY OF THE INVENTION

The present invention overcomes the disadvantages of prior approaches to generating two-dimensional images of transforms of three-dimensional solid objects in a graphics processing system by avoiding the need to transform the object per se.

According to a first aspect, the present invention includes: a method of generating means in a graphics processing system comprising storage and processing means, a two-dimensional image of a transform of a solid object as viewed in a viewing direction from a viewing point, said image being made up of an array of image pixels, the method including:

(a) the initial step of:
   establishing in storage the functional definition of the object in world space;
   establishing in storage a functional definition of a three-dimensional box defining viewing space; and
   defining in storage an inverse transform operator which is the inverse of the transform operation which would need to be performed on the object in world space in order that its transform could be presented with respect to the viewing point and direction within the box in viewing space; and (b) the subsequent step of:
  subdividing the box in viewing space into progressively smaller sub-boxes until sub-boxes are created whose frontal area corresponds to at least a desired resolution and generating test-cells in object space by performing the inverse transform operations on sub-boxes using the inverse transform operator;
  determining, for each row of sub-boxes having said frontal area corresponding to at least a desired resolution, said rows extending in the box parallel to the viewing direction and being associated with corresponding pixels in the array forming the image, which is the sub-box, if any, nearest in that row to the viewing point whose corresponding test-cell intersects the object; and storing the setting of the color and/or intensity for the pixels associated with the respective rows appropriate to the determination of the nearest sub-box for each row.

whereby a two-dimensional image of a solid object may be generated without transforming the object itself.

According to a second aspect, the present invention includes: a graphics processing system for generating a two-dimensional image as viewed in a viewing direction from a viewing point of a three-dimensional solid object including:

first storage means for a functional representation of the object defined with respect to world space;

second storage means for a functional representation of a three-dimensional box defining viewing space;

third storage means for an inverse transform operator which is the inverse of the transform operation which would need to be performed on the object in order that its transform could lie within the box in viewing space; and processing means for subdividing the box in transform space into progressively smaller sub-boxes until sub-boxes are created whose frontal area corresponds to at least a desired resolution, for generating test-cells in object space by performing the inverse transform operations on sub-boxes using the inverse transform operator, for determining, for each row of sub-boxes having said frontal area corresponding to at least a desired resolution, said rows extending in said box parallel to the viewing direction and being associated with corresponding pixels in the array forming the image, which is the sub-box, if any, nearest in that row to the viewing point whose corresponding test-cell intersects the object; and for storing in results storage the setting of the color and/or intensity for the pixels associated with the respective rows appropriate to the determination of the nearest sub-box for each row.

The present invention, therefore, avoids the need to transform the object by performing an inverse transform on space instead.

A co-pending application of even date, now U.S. Pat. No. 4,858,149, relates to a method of generating a spatial representation of a three-dimensional solid object and a system for performing such a method. The spatial representation referred to could be an image of the object, but could also relate to the spatial distribution of the object per se. Moreover, the copending application is concerned with the generation of such representations of objects which cannot be defined directly in terms of simple object primitives. In contradistinction thereto, the present invention is solely concerned with generating two-dimensional representations of the transforms of objects.

The foregoing and other objects, features and advantages of the invention will be apparent from the more particular description of the preferred embodiments of the invention, as illustrated in the accompanying drawings.

BRIEF DESCRIPTION OF THE DRAWINGS

The present invention will be particularly described with reference to the attached drawings of which:

FIGS. 1A, 1B and 1C are illustrations of a dumb-bell, a tree structure for defining the dumb-bell, and a spatial sub-division method for evaluating the object respectively;

FIGS. 2A and 2B are schematic diagrams illustrating the prior art approach to generating a perspective view of a solid object;

FIGS. 3A and 3B are schematic diagrams illustrating the approach adopted by the present invention to generate a perspective view.

In the drawings, like elements are designated with similar reference numbers, and identical elements in different specific embodiments are designated by identical reference numbers.

DESCRIPTION OF A PREFERRED EMBODIMENT OF THE INVENTION

Figure 4:
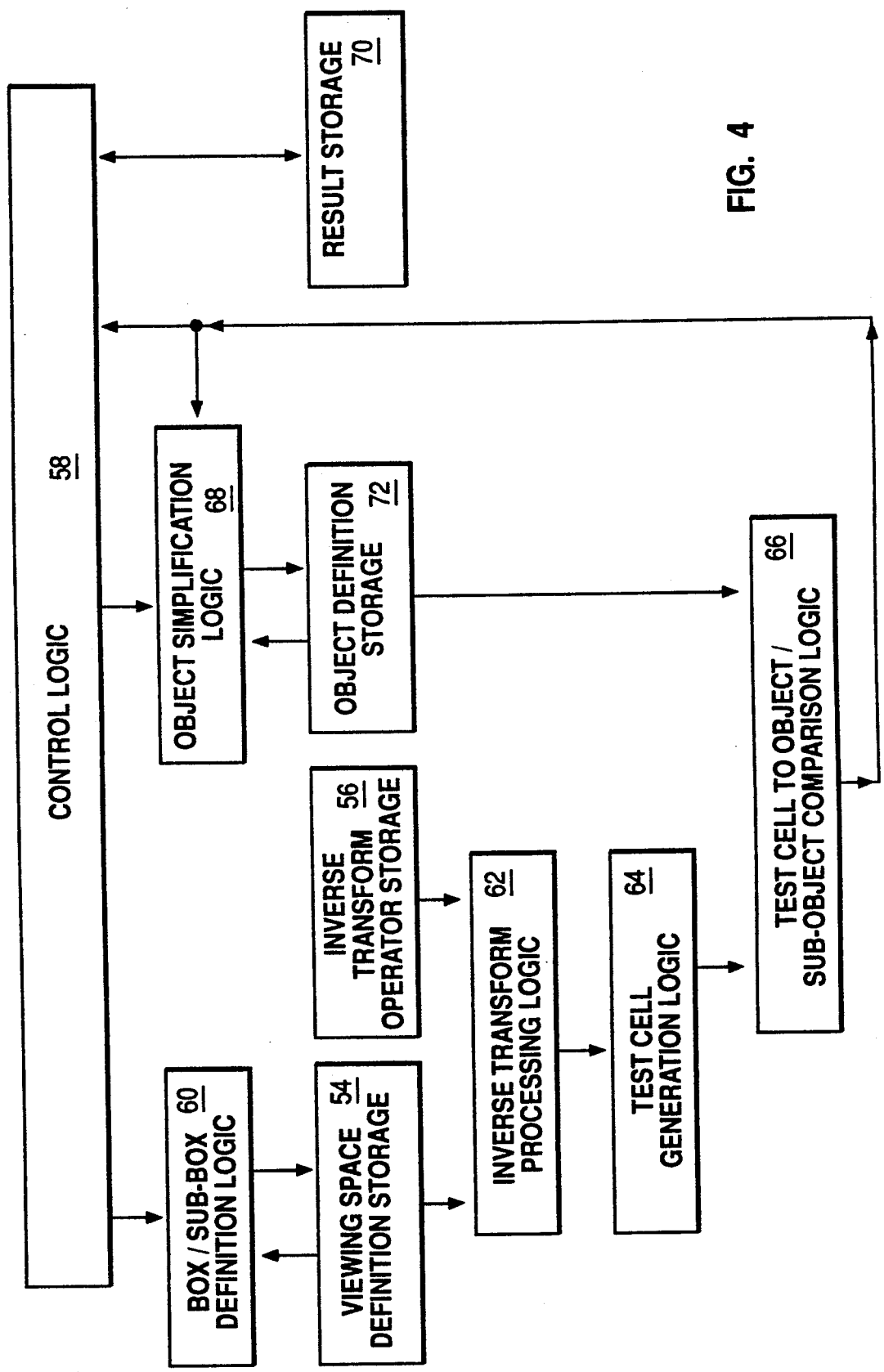
FIG. 4 is a schematic block diagram showing the interrelationship between logical and storage units of part of a graphics processing system.

Before describing the present invention in detail it is perhaps useful to discuss the principles of evaluating a functional definition of an object using CSG.

In general terms, the evaluation of a solid model is the process of determining the inside and outside and thus the boundaries of the solid. The most common use of the evaluation process is to draw a 2-D picture of the object. In general, it is also possible to compute the mass properties such as volume or center of gravity, to determine the surface area of the object, and so on, but the present invention is not concerned with such other applications.

Conventionally an object is defined in accordance with the principles of constructive solid geometry in terms of a tree structure such as that shown in FIG. 1B.

FIG. 1A is an illustration of a dumb-bell 10 such as that mentioned earlier. FIG. 1B illustrates a tree structure 20 for defining the dumb-bell. A practical implementation of this could be a linked-list storage structure. Different element types could be included in the linked-list to identify combination of operators, functional definitions etc. Mathematically, the definition of the dumb-bell could be expressed as $$\text{Dumb-bell} = A + B + C*D*E$$

Where "*" is the mathematical union operator shown as "AND" in FIG. 1B, "+" is the mathematical intersection operator shown as "OR" in FIG. 1B and A, B, C, D and E are the mathematical expressions for the sphere A, the sphere B, the infinite cylinder C, the half space D to the right of the line 12 and the half-space E to the left of the line 14. The corresponding functional definitions for the primitives A, B, C, D and E are located at the leaves 22a, 22b, 22c, 22d and 22e respectively in the tree structure 20.

In order to perform calculations based on such a definition it is usual to employ a spatial sub-division technique, as illustrated below with reference to FIG. 1C.

The basic method of spatial sub-division is as follows:

A region of space 30 is considered containing the object to be evaluated. The constructive solid geometry expression 20, or functional definition, which defines the object is inspected and simplified within this region of space. The simplification is not valid everywhere, but is equivalent to the original object within the region under consideration. The simplification procedure is:

1. For primitive objects, determine whether the object is completely outside the cube of space. If it is, replace the object by an EMPTY object, one which has no inside. Also determine whether the object completely encompasses the region of space. If this is so, replace the object by a FULL object—one which has no outside.

2. For compound objects made by applying set operators, recursively apply (essentially three-valued) Boolean logic to the simplified operands. For example:

| | | | |
|---|---|---|---|
| EMPTY | UNION expression 2 | → | expression 2 |
| expression 1 | UNION EMPTY | → | expression 1 |
| FULL | UNION expression 2 | → | FULL |
| expression 1 | UNION FULL | → | FULL |
| and | | | |
| EMPTY | INTERSECT expression 2 | → | EMPTY |
| expression 1 | INTERSECT empty | → | EMPTY |
| FULL | INTERSECT expression 2 | → | expression 2 |
| expression 1 | INTERSECT FULL | → | expression 1 |

If the result of this simplification is EMPTY, the object has no inside within the region under consideration. If a picture is being drawn, this region will make no contribution to the screen image. (NB: If mass properties note being computed, the region would make no contribution to the volume or moment.)

If the result of the simplification is FULL, the region is completely occupied by the object. When constructing a picture from one view, this region will not contribute to the image as it does not contain a surface facing the viewer, and the inside of an object is hidden by its surfaces. (NB: For mass properties, the entire region would contribute to the volume or moment being computed.

Normally, the expression will contain at least one term. In some circumstances, the expression will be sufficiently simple to be treated directly. For instance it may be a single planar half-space. The contribution to the picture or mass property of the total object can be computed directly. In order to proceed in other cases, the region of space is divided into smaller regions. Most simply, it could be divided in half perpendicular to its longest dimension. However, in FIG. 1C the space 30 is shown divided into 8 smaller regions 31, 32, 33, 34, 35, 36, 37, 38. The simplification process is then repeated on these new regions until expressions such as FULL, EMPTY or other simple cases are obtained.

Eventually, some lower limit on the size of regions is reached and still some regions contain non-simple expressions. When drawing a picture, the convenient stopping point is when regions are smaller than a single pixel. At this stage, regions which contain a single object will contain a pixel-sized surface of the object. Regions containing two objects will contain an edge where the two surfaces meet and regions containing three objects will normally contain a vertex.

When drawing a picture, the surface or edge is drawn. For a surface, the normal to the surface is computed at the center of the region of space and this is used, in conjunction with the known positions of light sources to compute the amount of light reflected from that point toward the viewer. For a more complex edge or vertex region, a ray-tracing method can be used to isolate one visible surface to be treated in this way. (NB: When computing mass properties, the cell could simply be assumed to be half-full.)

When generating a 2-D image of the solid object, it is sometimes necessary to produce an image based on some transform of an object. Most commonly it is desired to produce an image of the object in true perspective. In this case the transform concerned is a perspective transform.

The following description of the invention is concerned with the generation of a 2-D perspective image. It should however be understood that the invention applies equally to generating images based on other transforms, e.g. to simulate distortions of an object.

FIGS. 2A and 2B illustrate how such a perspective image would be produced using the teaching of the prior art.

FIG. 2A represents the cylinder 46 within a region of space 44 shaped as a truncated pyramid, which illustrates the extent of space seen by a viewer looking through a window 40 located coextensive with the front surface 42 of the truncated pyramid. Conventionally, in order to produce a 2-D perspective image, the object is transformed into perspective viewing (transform) space such that the region of space within the truncated pyramid 44 is contained within a rectangular box 48 as shown in FIG. 2B. The distorted object 50 is then evaluated by applying the spatial sub-division method discussed earlier.

However, as has already been mentioned, although this approach works in theory, it is impractical for a large set of objects and/or transformations because of the complexity of the transformed functional definitions. The present invention avoids the need for transforming the objects themselves by transforming space instead, and therefore allows a much greater range of objects and transformations to be evaluated.

Although for ease of representation and understanding, only the generation of the 2-D perspective image of a cylinder is illustrated, it should be understood that the object would normally be of a high degree of complexity, much higher, even, than that of the dumb-bell shown in FIG. 1A.

The or each component primitive of the object is in fact retained in its own coordinate system, and is tested against regions of space in that coordinate system. The functional definition of box 48, e.g. a rectangular box, is established which defines the perspective viewing space into which the object would conventionally have been transformed. However, rather than transforming the object as taught by the prior art, the rectangular box is instead transformed through the inverse of the transformation which would conventionally have been performed to provide, in the case of the perspective transformation, a truncated pyramid 44. If then, the rectangular box in perspective viewing space is subjected to the sub-division algorithm discussed above, but with the inverse transforms of the sub-boxes created being tested for intersection with the primitive(s) making up the object, the need to transform the object itself is eliminated.

The sub-division algorithm is not affected in any material way if the region of space considered is larger by some factor than it should be. All that will happen is that the expression resulting from the simplification will sometimes contain terms which, strictly speaking, could be eliminated. Provided the error is reduced as the regions under consideration get smaller, these redundant terms will be eliminated later in the evaluation. Efficiency will be reduced and it may be necessary to continue evaluation to a smaller minimum region-size but the sub-division algorithm continues to operate correctly.

The method of generating a two dimensional perspective image of a cylinder using the teaching of the present invention will now be illustrated with reference to FIGS. 3A, 3B and 4.

FIG. 4 shows the functional elements of a graphics processing system which are relevant to the explanation of this method.

These functional elements could be implemented by suitably programming a conventional programmable graphics processing system. Alternatively, the functional units shown in the figure could be provided as separate hardwired circuits in a graphics processing system. Conventionally a graphics processing system will comprise storage and processing means and means for the input of data (e.g. a keyboard) and for the output of data (e.g. a cathode ray tube display device).

Firstly, a functional definition of the object to be transformed—in this case a cylinder 26—is stored in object definition storage 72. In the case of a composite object a tree structure of the type described with reference to FIG. 1B would be stored in the object definition storage.

A functional definition of a box 48 is stored in viewing space definition storage 54. In this case the box is rectangular. It could however take any other suitable form, e.g. that of a cylinder. The functional definition could also take any suitable form. One possibility would be a tree structure in the form of a linked list. The definition of a rectangular box could then take the form of the intersection of six planar half-spaces. Another possibility for a cube would be to identify the center and to define the vector from that center to one corner of the cube. The box 48 is defined in perspective transform space with respect to the intended viewing point and viewing direction. Conveniently, one of the axes of the box can be aligned parallel to the intended viewing direction so that the front surface 52 of the box is normal to the viewing direction.

An inverse transform operator is stored in inverse transform operator storage 56. In this case the operator is an inverse perspective transform operator, that is the inverse of the perspective transform operator which would be needed to transform the object stored in definition storage into the rectangular box 48 in perspective viewing space so as to create the intended functional representation of the object.

Then the control logic 58 causes the box/sub-box definition logic 60 to select the rectangular box for comparison against the object. The inverse transform logic 62 performs an inverse transform operation on the rectangular box using the inverse transform operator. The resulting truncated pyramid 44 (in the case of the inverse of the transform shown in FIG. 2) can then either be passed by the test-cell generation logic 64 directly to the comparison logic 66, or, as will be described later, a simplified test-cell can be generated from the inverse transform of the rectangular box (or sub-box) by the logic 64 and this passed to the comparison logic 66.

The object and the test-cell functional definitions are tested for intersection by being compared in the comparison logic 66 and an essentially three-valued Boolean comparison output generated as described earlier—i.e. FULL, EMPTY or partly filled. The output of the comparison logic is passed to the control logic 58 and to the object simplification logic 68.

The control logic reacts in one of a number of ways dependent on the result of the comparison:

i) In the case where an intersection is detected and the box or sub-box under consideration has a frontal area which is larger than a desired resolution, then the control logic causes the box/sub-box subdivision logic to divide the box or sub-box under consideration into a number, for example, eight smaller sub-boxes for evaluation in order in the next stage.

ii) In the case where an intersection is detected and the size of the box or sub-box under consideration has a frontal area which corresponds to the desired resolution, then this fact is stored in the result storage 70.

iii) If there is no intersection, then examination of the box or sub-box under consideration is terminated and this fact is recorded.

A pixel map of the image can thereby be built up in the results storage 70 by the control logic 58. Conveniently, a rectangular box is arranged with respect to the intended viewing point such that one of its axes is parallel to the viewing direction, and the sub-division process is arranged to examine rows of sub-boxes parallel to that viewing direction in making up the image. Each pixel on the image can then be arranged to correspond to a row of sub-boxes having a frontal area corresponding to the size of a pixel parallel to the viewing direction. This arrangement is not, however, essential, and other shapes and orientations of the box are possible, particularly if it is desired to generate unusual views (distortions, stereo views etc) of the object. The control logic will be arranged to cause sub-boxes which are nearer to the front of the object, as seen in the intended image, to be processed before those further away, so that the front surfaces of the object may be determined. Where a pixel-sized sub-box in a row (i.e. a sub-box whose frontal area approximates the size of a pixel) is found whose corresponding test-cell intersects the object, sub-boxes in that row further from the front of the object need not then be considered. The control logic maintains a record of the progress of the sub-division process. This record could be in the form of a tree-structured record, a bit-map, or any other suitable form.

When the front surface of the object has been detected, the required color and/or intensity of the pixel concerned can be determined using, for example, a ray-tracing technique. The vector representing the normal to the surface of the object in any test-cell can be computed from the functional representation of the object. By comparing the transformed vector against one or more vectors representing light-sources, the color and or intensity of the pixel corresponding to that test-cell can be determined.

The object simplification logic 68 is used to generate a simplified functional definition in the case where the object to be transformed is formed from a plurality of primitives. After one or more sub-divisions of the rectangular box, the output of the comparison logic may show that the test-cell does not intersect one or more of the primitives in the object. In this case, on further sub-divisions of that region of the rectangular box, the functional definitions of these primitives need not be compared against the test-cells for that sub-divided region. The object simplification logic selects those parts of the functional definition of the whole object which are relevant at any stage dependent on the results of previous comparison operations. This is achieved by traversing the structure stored in the object definition storage.

The test-cells can be formed by the functional definitions of the inverse transforms of the sub-boxes. This is not, however, essential. The inverse transform of a sub-box could instead be replaced by a simple 3-D volume centred on and circumscribing that inverse transform. By a "simple 3-D volume" is meant a volume such as a sphere, a rectangular box or an ellipsoid. This is because any part of the object which intersects the inverse transform of the sub-box will also intersect the circumscribing volume centred on that transform. If a simplified test-cell is used, this would be generated by the test-cell generation logic 64 by determining the center of the transform of the box or sub-box and defining the circumscribing simple 3-D volume around the transform, the only effect on the method might be that a further stage of sub-division may be necessary in order to achieve the same resolution as would be achieved with the inverse transform itself as the test-cell.

In order to minimise the degree of mismatch between the test-cell and the transform of the sub-boxes, the lengths of the sub-boxes in the viewing direction and the test-cells used should be chosen so that the test-cell approximates the shape and size of the transform of the sub-boxes. By degree of match is meant the degree to which the transform and the test-cell are co-extensive. This can be achieved by choosing the depth of the transform of such sub-box to correspond generally to its width and height. Thus all the transforms of the sub-boxes in any particular row will have the same shape although their size will change.

Although specific features of an embodiment of the invention are described in the foregoing, it should be understood that modifications will be obvious to the skilled person. Also, for ease of illustration only relatively simple objects and transforms have been illustrated. However, it should be understood that the present invention allows objects and transforms of high complexity to be treated.

We claim:

1. A method of generating in a graphics processing system comprising storage and processing means, a two-dimensional image of a transform of a solid object as viewed in a viewing direction from a viewing point, said image being made up of an array of image pixels, the method comprising:
   (a) the initial step of:
      establishing in storage (72) the functional definition of the object in world space;
      establishing in storage (54) a functional definition of a three-dimensional box (48) defining viewing space; and
      defining in storage (56) an inverse transform operator which is the inverse of the transform operation which would need to be performed on the object in world space in order that its transform could be presented with respect to the viewing point and direction within the box in viewing space; and
   (b) the subsequent step of:
      subdividing the box in viewing space into progressively smaller sub-boxes until sub-boxes are created whose frontal area corresponds to at least a desired resolution and generating test-cells in object space by performing the inverse transform operations on sub-boxes using the inverse transform operator;
      determining, for each row of sub-boxes having said frontal area corresponding to at least a desired resolution, said rows extending in the box parallel to the viewing direction and being associated with corresponding pixels in the array forming the image, which is the sub-box, if any, nearest in that row to the viewing point whose corresponding test-cell intersects the object; and
      storing the setting of the color and/or intensity for the pixels associated with the respective rows appropriate to the determination of the nearest sub-box for each row;

whereby a two-dimensional image of a solid object may be generated without transforming the object itself.

2. A method according to claim 1 wherein the desired resolution is the pixel resolution of the image.

3. A method according to claim 1 wherein the two-dimensional image is a two-dimensional perspective image of the three-dimensional solid object, and wherein the box defines perspective viewing space and the inverse transform operator is an inverse perspective transform operator.

4. A method according to claim 1 wherein sub-steps of (b) are performed recursively as a plurality of stages such that, at each stage the test-cell corresponding to the sub-box under consideration is tested for intersection with the object and for the case where an intersection is detected the sub-division processes is terminated for that sub-box if its frontal area corresponds to at least the desired resolution, otherwise the sub-box is further divided into smaller sub-boxes which are considered in turn in the next stage, whereas in the case where no intersection with the object is detected, the sub-division process is terminated for the sub-box under consideration irrespective of its size.

5. A method according to claim 4 wherein sub-boxes nearer to the viewing point are considered before those further away, whereby sub-boxes need not be processed where the setting for the corresponding pixels has already been determined.

6. A method according to claim 5 wherein the step of generating a test-cell comprises the step of determining a predetermined point of the transformed box or sub-box under consideration and defining a simple 3-D volume in viewing space about said point which fully contains the transformed box or sub-box, said volume then forming the test-cell for the box or sub-box under consideration.

7. A method according to claim 6 wherein the length of each sub-box is determined so as to optimise the match between the inverse transform of that sub-box and the simple 3-D volume.

8. Method according to claim 4 wherein the step of testing for an intersection between a test cell and the object comprises the step of testing for an intersection between the test cell, and a simplified functional representation of the object, the simplification appropriate being determined as a result of previous intersection test operations.

9. A method according to claim 1 wherein the step of storing the setting of the color and/or intensity for the pixels comprises the step of comparing a vector representing the normal to the surface of the object within a test cell with at least one vector representing a light source.

10. A graphics processing system for generating a two-dimensional image as viewed in a viewing direction from a viewing point of a three-dimensional solid object including:

first storage means (72) for a functional representation of the object (46) defined with respect to world space;

second storage means (54) for a functional representation of a three-dimensional box (48) defining viewing space;

third storage means (56) for an inverse transform operator which is the inverse of the transform operation which would need to be performed on the object in order that its transform could lie within the box in viewing space; and processing means (58, 60, 62, 64, 66, 68) for subdividing the box in transform space into progressively smaller sub-boxes until sub-boxes are created whose frontal area corresponds to at least a desired resolution, for generating test-cells in object space by performing the inverse transform operations on sub-boxes using the inverse transform operator, for determining, for each row of sub-boxes having said frontal area corresponding to at least a desired resolution, said rows extending in said box parallel to the viewing direction and being associated with corresponding pixels in the array forming the image, which is the sub-box, if any, nearest in that row to the viewing point whose corresponding test-cell intersects the object; and for storing results storage (70) the setting of the color and/or intensity for the pixels associated with the respective rows appropriate to the determination of the nearest sub-box for each row.

* * * * *